March 1, 1960     G. A. KRUDER     2,926,619
MIXING MACHINE
Filed Feb. 21, 1955
FIG. 1
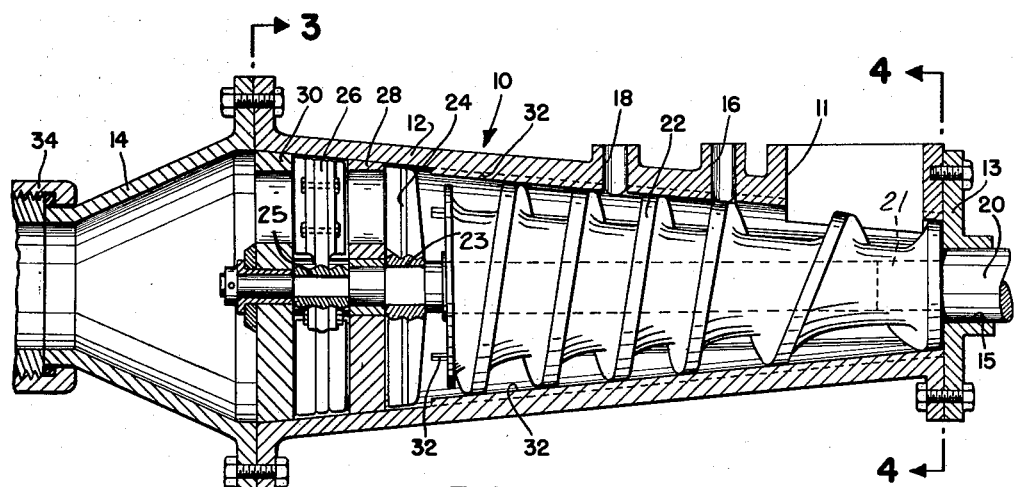
FIG. 2
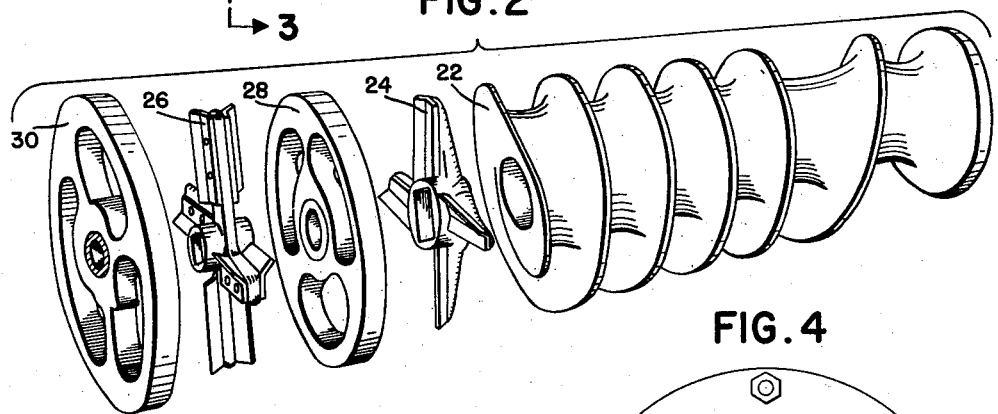
FIG. 3
FIG. 4
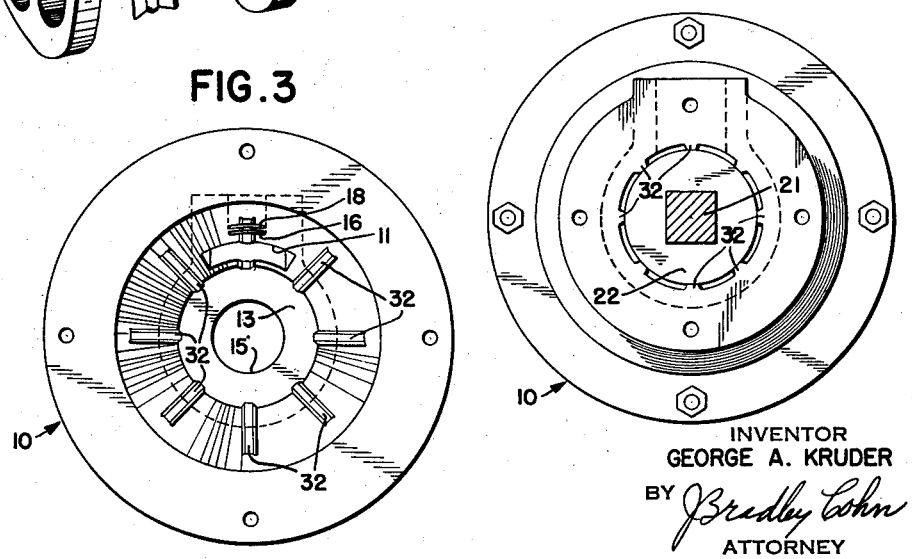
INVENTOR
GEORGE A. KRUDER
BY Bradley Cohn
ATTORNEY

2,926,619

MIXING MACHINE

George Arthur Kruder, East Norwalk, Conn., assignor to American Machine & Foundry Company, a corporation of New Jersey Application February 21, 1955, Serial No. 489,435

7 Claims. (Cl. 107—30)

This invention relates to wet and dry incorporators or mixers.

It is an object of this invention to provide an apparatus adaptable to incorporate together and to mix continuously wet and dry ingredients and to continually deliver said ingredients forwardly to a closed system.

It is a further object of this invention to provide a dust-free means of incorporating powdered or flaky substances with a liquid or liquids suitable to receiving said substances continuously, from dry and wet substance feed metering devices respectively.

It is an object of this invention to prevent during said continuous mixing the flow-back of the liquid into the dry metered feed. In such type of mixing, as with flour and water, the backward flow of liquid will form cakes and lumps which interfere with and choke the dry feed entrance, interfering with subsequent metered mixing.

It is an object of this invention to provide for a considerable backward flow or slippage within the downstream part of the mixing barrel through the free spaces between the ridges or rifling in the mixing barrel to greatly improve mixing. This backward flow, however, does not extend all the way back to the solids feed inlet, nor even to the primary liquid inlet. At these points the wet and dry ingredients are moving forward at a rapid rate while starting to mix. This prevents wetting of the apparatus area containing the dry flour or powdered materials.

It is a further object of this invention to premix wet and dry ingredients into a smooth uniform premix in a very short time. In the case of dough ingredient incorporation, the specific object is to incorporate the wet and dry ingredients together into a smooth uniform premix completely devoid of discernible solid particles or lumps in a very short period of time, as for example five seconds. In the case of bread dough ingredient incorporation, it is a further specific object to begin converting this uniform premix into a tough, dry, developed dough to the extent that the completion of dough development in subsequent equipment provided for this purpose is materially aided.

It is a further object of the invention to provide a continuous mixer for wet and dry ingredients having a self-cleaning, non-pluggable inlet for the dry ingredients and a means for introducing liquids at low pressure (down even to one pound p.s.i.g.) without plugging the liquid inlet.

It is a further object of the invention to be able at will to control over a useful range the extent of air incorporation into the mix and consequently the density of the mix by varying the r.p.m. of the mixing worm. It is a further object of my invention to be able at will to control over a wide range the extent of mixing at any given r.p.m. (as evidenced by mixing power) by adjusting the discharge pressure from the "incorporator" either by utilizing a vairable discharge outlet (such as a partially closed plug valve) or by utilizing a variable speed booster pump at the discharge outlet to convey the mix to subsequent processing equipment.

It is a further object of this invention to provide an ingredient incorporator-mixer which can continuously receive accurately metered wet and dry ingredients and which, after performing its previously described functions on these ingredients, can continuously deliver the mixture formed at an equivalent uniform rate undisturbed by the mixing.

The novel features which I believe to be characteristic of my invention are set forth with particularity in the appended claims. My invention itself, however, both as to its organization and method of operation may be understood by reference to the apparatus embodying my invention and shown in the accompanying drawings in which:

Fig. 1 shows a sectional side elevation of the mixing machine;

Fig. 2 is an exploded view in perspective showing the component parts of the mixing member with the driving shaft being omitted;

Fig. 3 is an end elevation of the mixer housing without the mixing members taken on the line 3—3 of Fig. 1; and Fig. 4 is a sectional end elevation taken on the line 4—4 of Fig. 1.

Referring to Fig. 1, there is shown a mixer housing 10 formed of the frusto conical mixing barrel 12 and back pressure adaptor 14 secured to each other in base to base relationship. The flow of material as shown will be from right to left and housing section 10 has a relatively large inlet port 11 to receive the flour. Inlet ports 16 and 18 are for liquid ingredients. In practising the process taught in the co-pending application of Bandel, Serial No. 477,195, filed Dec. 23, 1954, port 16 is utilized for the brew and port 18 for the shortening but it is understood that this invention is not limited to any particular process. The rotating drive shaft 20 rotates clockwise when viewed from the input end and as shown in Fig. 4 has mounted thereon for rotation therewith the conical worm 22 and the knives 24 and 26. Stationary plates 28 and 30 are mounted about the drive shaft and are secured against rotation by frictional engagement with the internal wall of mixing barrel 12. The internal wall of the housing 10 has the alternating ridges or straight rifling 32 running along that portion of housing section 10 surrounding the worm 22. As used in the claims, the term "rifling" includes straight longitudinal ridges 32 as well as such ridges being formed in the more conventional helix of a rafle. The clearance between the ridges 32 of the periphery of the worm 22 is very small, being merely sufficient for free rotation. The infeed end of mixing barrel 12 is closed by the plate 13 having a bore 15 to receive driving shaft 20. Tapered housing adaptor section 14 is fitted to a flexible delivery pipe 34 which may lead to a constant volume pump (not shown) or to a restriction valve (not shown) which will provide both constancy of flow as well as back pressure in the mixing apparatus.

Worm 22 and knives 24 and 26 are secured to rotate with the shaft 20 either by suitable keyways or as shown (Figs. 2 and 4) by having a non-circular configuration with the shaft where the shaft engages complementary bores in these members. As illustrated, the shaft is squared at 21 where it engages the worm. It is also squared and stepped down at 23 and again at 25 where it engages the knives 24 and 26, respectively. Thus when adaptor section 14 is separated from the mixing barrel 12 worm 22 may be slipped onto the shaft followed by knife 24, plate 28, knife 26 and plate 30. This permits ready disassembly for cleaning.

The worm 22 has a rapid change to a smaller pitch after about the first two turns at the infeed (right hand) end. This is followed by a relatively constant pitch toward the discharge end. Thus when flour or other comminuted dry material is received in the open port 11 it is rapidly swept forward (to the left) and liquid ingredients forced through the closed ports 16 and 18 are prevented from seeping backward to wet the infeed ingredients at entry port 11, which would cause clogging of the port 11. The action results in the solid comminuted material being largely air suspended as it is swept forward uniformly into the mixing barrel 12. As the liquid ingredients are added and the materials move more deeply into the barrel, pressure and resistance to flow is rapidly built up. At the final few turns this pressure results in a certain amount of back circulation causing intensive mixing, particularly when the discharge pressure is increased to moderate levels as by a restriction valve or constant volume pump. Throttling action is also provided by the decreasing diameter of frusto cone 14. The smooth tapered inner surface of the cone prevents any stagnant regions. The developed back pressure is necessary for good mixing.

Use and operation

While this mixer is suitable for mixing any relatively heavy or viscous mass of wet and dry material, it has been more particularly adapted for continuous incorporation of the ingredients of bread dough which are primarily flour, water and oleaginous shortening. It has been used successfully as a pre-blender in practicing the continuous bread process shown in the above mentioned co-pending application of Bandel, S.N. 477,195.

In this operation, flour is metered, as for example by a continuous gravimetric feeder, into the open port 11. The pre-fermented aqueous brew containing yeast and other ingredients of bread dough is metered into the port 16 and liquid shortening enters the port 18. As these ingredients are swept forward and the pressure increases, back flow is created between the ridges 32. This backward flow increases mixing action and it has even been noted that it will start development of the dough gluten because of the circulatory or squeezing action, although it is not asserted that this mixer will adequately develop dough to a sufficient extent for satisfactory commercial bread making without subsequent mechanical action. As the dough is delivered from the end of the worm it has become a smooth, viscous, homogenous material containing no evidence of solid particles or lumps. However, the gas phase resulting from air incorporation is usually not dispersed so thoroughly as to be invisible. It has been found that the addition of the stationary plates 28 and 30 with the intervening rotating knives 24 and 26 which are positioned very close to the plates further subdivide the gas phase and also aid in beginning the development of the dough by smearing it along the plates. It is expressly pointed out that these knives are not used to break up solid particles, for no solid particles, as lumps of flour, are present in the homogenized mix when it reaches the knife portion of mixing barrel 12.

The speed of the rotation of the worm depends to a large extent upon the desired throughput rate. In one commercial installation wherein the mixing barrel 12 was 24 inches long, the base diameter of the barrel's cone 8 inches and the throughput rate 3600–4000 lbs. per hour a satisfactory homogenous raw dough was obtained by rotary speed of approximately 450 r.p.m. Slower speeds were used at lower throughput rates to obtain comparable pre-mix dough characteristics. Of course, there is a limitation on the lower side of the r.p.m. for if the worm r.p.m. is too slow, the ingredients will not move fast enough to prevent pluggage at the inlet 11. Above this minimum r.p.m., however, the characteristics of the pre-mix show little change for a variation in r.p.m. except a decrease in density which may be corrected by increasing discharge pressure. The power required to continuously mix and extrude the pre-mix from the discharge outlet also rises only to a slight degree with increased r.p.m. This is in sharp contrast to the great change effected by a slight variation in discharge pressure. For example, a rise to 12 p.s.i.g. from 4 p.s.i.g. at the discharge station has been found in one commercial installation to result in a more than three fold rise in the mixing power at constant r.p.m. This is because at the higher pressure the back circulation becomes intense with an improved result. The advantages of the back flow have been clearly demonstrated by operating identical equipment as shown in Fig. 1 but having a smooth bore mixing barrel 12. Such equipment failed to yield more than a mere heterogeneous mix of slightly wet solid flour and thin aqueous liquid when operated at practical commercial production range. It has also been discovered that a longer worm design but having shallower grooves or rifling in the barrel yielded a higher discharge pressure for the same power input. Such a modification would be desirable where a very high discharge pressure is sought, as for example where the next subsequent step included high pressure processing equipment and it was desired not to use a pump.

I claim:

1. In an incorporator for continuously mixing the liquid and dry ingredients of dough, a housing having an elongated longitudinal bore formed therein, longitudinally extending ridges along the length of said bore, a worm operatively mounted for rotation in said bore to feed material in one direction therealong, an initial port communicating with said bore to continuously receive dry ingredients into said bore, said worm having a relatively higher pitch adjacent and past said dry ingredient port to move material more rapidly through said bore from said port, a subsequent port communicating with said bore to receive a liquid ingredient to be mixed with said dry ingredient, the pitch of said worm being thereafter reduced to provide an area of mixing of said wet and dry ingredients, said worm being constructed and arranged to coact with said ridges and said bore to permit backflow in the area of lower pitch of said worm as material is fed thereto from said area of higher pitch, said bore having means to restrict the effluent of material fed therethrough by said worm and mechanisms to rapidly rotate said worm to create adjacent the low pitch portion of said worm an area of positive pressure and resistance to flow to cause backward flow and intensive mixing of said liquid and dry ingredients about the flights of said worm and between said ridges to form a mix.

2. A device as set forth in claim 1 and further characterized by a transverse plate mounted in said bore beyond said worm in the direction of flow of said mix and having openings formed therein, and a rotary knife operatively mounted adjacent said plate and operative to coact with said mix passing through the openings in said plate.

3. A device as set forth in claim 2 and further characterized by an extension of said housing in the direction of flow of said mix, said extension of said housing having a bore of progressively diminishing size formed therein to progressively compress said mix.

4. A device as set forth in claim 2 and further characterized in that said worm and said knife are mounted on the same axis.

5. A device as set forth in claim 2 and further characterized by a single shaft mounted for rotation in said longitudinal bore, said mechanism being operatively connected to drivingly rotate said shaft and said knife and said worm being secured on said shaft to rotate therewith.

6. A device as set forth in claim 1 and further characterized by an extension of said housing in the direction of flow of said mix, said extension of said housing having a bore of progressively diminishing size formed therein to progressively compress said mix.

7. A device as set forth in claim 1 and further characterized in that said means to restrict include a delivery passage of reduced cross sectional area.

References Cited in the file of this patent

UNITED STATES PATENTS

| | | |
|---|---|---|
| 392,488 | Behm | Nov. 6, 1888 |
| 523,116 | Gelinck | July 17, 1894 |
| 822,101 | Copleston | May 29, 1906 |
| 1,044,048 | Hicks | Nov. 12, 1912 |
| 1,226,642 | Demovitsch | May 22, 1917 |
| 1,718,893 | Brown | June 25, 1929 |
| 1,790,347 | Hawkins | Jan. 27, 1931 |
| 2,583,600 | Schreiber | Jan. 29, 1952 |
| 2,626,856 | Alles | Jan. 27, 1953 |
| 2,633,170 | Balmain | Mar. 31, 1953 |

FOREIGN PATENTS

| | | |
|---|---|---|
| 104,559 | Austria | Nov. 10, 1926 |
| 106,938 | Germany | Mar. 5, 1898 |
| 523,148 | Belgium | Oct. 15, 1953 |